United States Patent
Lewis et al.

[11] Patent Number: 5,176,176
[45] Date of Patent: Jan. 5, 1993

[54] NON-DEGRADING BACK PRESSURE REGULATOR

[75] Inventors: Richard D. Lewis, Bloomington; James P. Korzenowski, Minneapolis, both of Minn.

[73] Assignee: Graco Inc., Minneapolis, Minn.

[21] Appl. No.: 792,342

[22] Filed: Nov. 14, 1991

[51] Int. Cl.⁵ .............................. F16K 15/14
[52] U.S. Cl. ...................... 137/859; 137/510
[58] Field of Search ...................... 137/859, 510

[56] References Cited

U.S. PATENT DOCUMENTS

| | | | |
|---|---|---|---|
| Re. 32,553 | 12/1987 | Bennett et al. | 137/271 |
| 3,105,507 | 10/1963 | Dunmire | 137/859 X |
| 3,566,913 | 3/1971 | Parthe, Jr. | 137/493 |
| 3,642,026 | 2/1972 | Sielaff | 137/525 |
| 4,003,405 | 1/1977 | Hayes et al. | 138/40 |
| 4,083,379 | 4/1978 | Aus der Au | 137/859 X |
| 4,182,355 | 1/1980 | Briel et al. | 137/496 |
| 4,243,070 | 1/1981 | Jackson | 137/859 X |
| 4,364,395 | 12/1982 | Redmond et al. | 604/10 |
| 4,664,146 | 5/1987 | Carter | 137/599 |
| 4,712,583 | 12/1987 | Pelmulder et al. | 137/852 |
| 4,846,215 | 7/1989 | Barree | 137/859 X |
| 4,886,086 | 12/1989 | Etchells et al. | 137/1 |
| 4,887,639 | 12/1989 | Lewis et al. | 137/505 |
| 4,949,750 | 8/1990 | Goodwin et al. | 137/510 |

Primary Examiner—Robert G. Nilson
Attorney, Agent, or Firm—Douglas B. Farrow

[57] ABSTRACT

A back pressure regulator is provided which utilizes laminar flow at all times to minimize degradation of paint which might have metallic particles passing there through. The pressure drop across the regulator is accomplished by utilizing this viscous friction rather than velocity change through an orifice as is common with a conventional pressure regulator.

5 Claims, 1 Drawing Sheet

NON-DEGRADING BACK PRESSURE REGULATOR

BACKGROUND OF THE INVENTION

Paint degradation of metallic paint and waterbased paints in circulating systems is a well known phenomena. Several attempts to address this issue have used laminar flow to improve the situation. U.S. Pat. No. 4,003,405 deals with regulation using laminar flow while U.S. Pat. Nos. 4,846,215 and 4,887,639 deal with application of the laminar flow principals to paint circulating system pressure regulation.

The aforementioned patents however have been utilized to regulate the pressures in drops off circulating lines by sensing and regulating the outgoing pressure of the regulator. It is desired to apply similar principles to a back pressure regulator which must in effect regulate incoming pressure rather than outgoing pressure.

SUMMARY OF THE INVENTION

It is therefore an object of this invention to provide a back pressure regulator which efficiently regulates the pressure in a circulating system while minimizing the degradation of solvent based metallic paints or waterbased paints.

It is further an object of this invention to provide a back pressure regulator which may be easily and inexpensively manufactured and which may be easily serviced when needed.

It is further an object of this invention to provide a regulator which minimizes the fluid shear rate.

A regulator is provided which has a fluid housing which has a central inlet passage opening into a very thin (axially) frustro-conical shaped diaphragm chamber. A diaphragm is sandwiched between the fluid housing and a spring housing and clamped together by means of bolts and the like.

An annular outlet chamber runs around the circular diaphragm chamber and in turn leads to an outlet passage. A backing plate supports the diaphragm over its complete central area with the exception of a small area adjacent the outlet chamber so as to prevent distortion of the diaphragm. By placing the unsupported area of the diaphragm at the point where pressure is the least, distortion of the diaphragm is thereby minimized.

Pressure drop is accomplished by viscous friction of the flowing fluid between the diaphragm and the fluid housing diaphragm chamber rather than the traditional method of changing velocity of the fluid by passing it through an orifice. The larger the diaphragm chamber face area and/or the narrower the gap, the more the pressure drops.

The high pressure fluid is fed into the center of the device so that the maximum force due to pressure is located at the center of the diaphragm. As the fluid flows radially outwardly to the outlet chamber and thence the outlet, the pressure drops so that the least pressure is acting against the largest surface area of the diaphragm thus minimizing distortion. The fluid face of the diaphragm chamber is tapered and the distances from the diaphragm to the diaphragm chamber at the inner and outer edges have been chosen so that fluid velocity will not exceed 250 inches per second with normal operating fluid flow and pressure drop.

Devices such as this are designed with a normal operating flow range of 8-10 gallons per minute with a maximum to 20-25 gallons per minute while normal working pressures are 80-100 psi with a maximum pressure of 200 psi. The maximum movement of the backing plate is very small indeed and is on the order of about 0.04 inches.

These and other objects and advantages of the invention will appear more fully from the following description made in conjunction with the accompanying drawings wherein like reference characters refer to the same or similar parts.

A BRIEF DESCRIPTION OF THE DRAWINGS

FIG. 1 is a cross-sectional view showing the regulator of the instant invention.

DESCRIPTION OF THE PREFERRED EMBODIMENT

Figure 1:
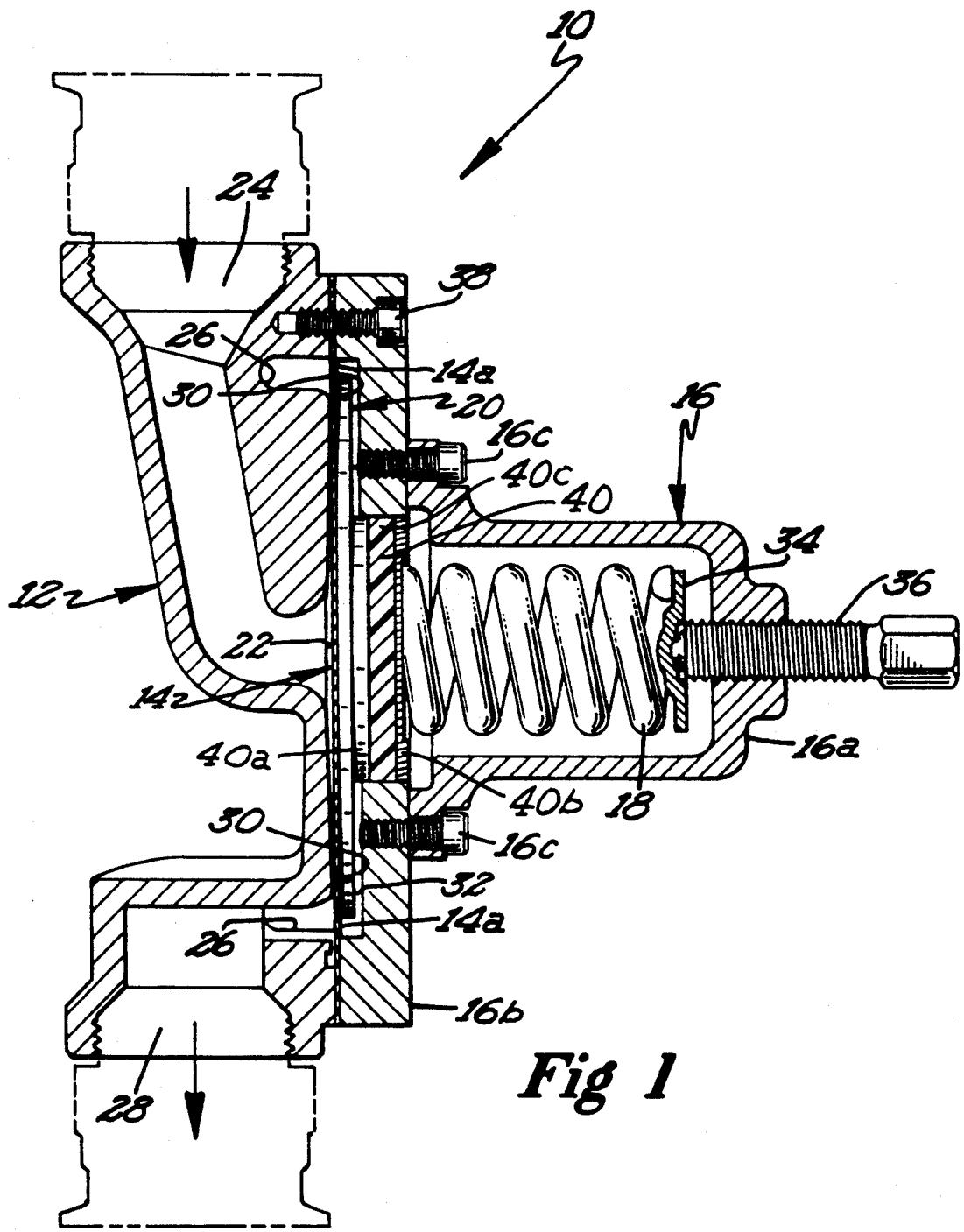

FIG. 1 shows the regulator of the instant invention generally designated 10. Regulator 10 is comprised generally of a fluid housing 12, a diaphragm 14 and a spring housing 16 containing a spring 18 and backing plate 20.

Fluid housing 12 has a very shallow frustro-conical diaphragm chamber 22 therein which extends from inlet passage 24 at the center thereof to outlet chamber 26 at the periphery. Outlet chamber 26 is an annular passage which connects to outlet passage 28. With the exception of inlet passage 24 and outlet passage 28, regulator 10 is rotationally symmetrical around the central axis formed by bolt 36.

When a no-flow condition is taking place such as shown in FIG. 1, diaphragm 22 is seated against the seating area 30 of diaphragm chamber 22 adjacent just radially inside outlet chamber 26.

As can be seen in FIG. 1, backing plate 20 supports diaphragm 14 across substantially the entire width thereof with the exception of a small area 14a adjacent outlet chamber 26 where the pressure is the lowest. This helps to minimize distortion of the diaphragm during its travel. A backing plate chamber 32 is located in spring housing 16. This allows a small amount of travel of backing plate 20 to the right in FIG. 1 to allow fluid to flow past the seating area 30. The total amount of travel is very small (on the order of 0.04 inches for a typical example). Bearing 40 (comprised of first portion 40a and second portion 40b and having a plastic insert 40c) centers backing plate 20 in housing 16b and allows the plate to move without binding.

Spring 18 is held in place by a spring cap 34 which is in turn adjustably biased by means of an adjusting screw 36. This allows the pressure to be set by simple adjustment of screw 36.

Spring housing 16 is actually comprised of two parts, a backing plate housing 16b and a spring chamber 16a which are secured together by bolts or other fastener 16c. Similarly, fluid housing 12, diaphragm 14 and spring housing 16 are clamped together using fasteners 38.

It is contemplated that various changes and modifications may be made to the back pressure regulator without departing from the spirit and scope of the invention as defined by the following claims.

What is claimed is:

1. A degradation minimizing fluid back pressure regulator for use with fluids such as paint, said regulator comprising:

a fluid housing side comprising:

a generally circular diaphragm chamber having a diameter, a circumference, a center and a varying depth;

an annular outlet passage at said circumference of said diaphragm chamber; and an inlet passage at the center of said diaphragm chamber; the depth of said diaphragm chamber increasing from approximately zero adjacent said circumference to a small fraction of said diameter adjacent said center;

a diaphragm extending across said diaphragm chamber;

a spring housing sandwiching said diaphragm between said spring housing and said fluid housing;

a backing plate located in said spring housing and contacting said diaphragm; and spring means pressing said backing plate against said diaphragm and said diaphragm against said fluid housing.

2. The regulator of claim 1 further comprising means limiting the travel of said backing plate away from said diaphragm chamber so as to maintain laminar flow in said chamber.

3. The regulator of claim 2 wherein said travel limiting means comprise a recess in said spring housing.

4. The regulator of claim 3 wherein said travel limiting means limits travel to about 0.040 inches.

5. The regulator of claim 1 wherein said depth of said diaphragm chamber is about 0.040 inches adjacent said center.

* * * * *